US009747799B2

(12) United States Patent
Shibata et al.

(10) Patent No.: US 9,747,799 B2
(45) **Date of Patent: *Aug. 29, 2017**

(54) RADIO DEVICE

(71) Applicant: Panasonic Intellectual Property Management Co., Ltd., Osaka (JP)

(72) Inventors: Teppei Shibata, Gifu (JP); Hiroyuki Watanabe, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,980

(22) Filed: Oct. 5, 2016

(65) Prior Publication Data

US 2017/0025011 A1 Jan. 26, 2017

Related U.S. Application Data

(63) Continuation of application No. 14/668,624, filed on Mar. 25, 2015, now Pat. No. 9,489,848.

(30) Foreign Application Priority Data

Mar. 28, 2014 (JP) ................................ 2014-070327
Oct. 31, 2014 (JP) ................................ 2014-223323

(51) Int. Cl.
*B60Q 1/00* (2006.01)
*G08G 1/16* (2006.01)
*G08G 1/0965* (2006.01)

(52) U.S. Cl.
CPC ........... *G08G 1/161* (2013.01); *G08G 1/0965* (2013.01); *G08G 1/166* (2013.01); *G08G 1/167* (2013.01)

(58) Field of Classification Search
None
See application file for complete search history.

(56) References Cited

U.S. PATENT DOCUMENTS 6,133,867 A * 10/2000 Eberwine .............. G01S 5/0072
342/125
2008/0089298 A1 4/2008 Anschutz et al.
(Continued)

FOREIGN PATENT DOCUMENTS

JP 2007-001405 A 1/2007
JP 2009-143343 A 7/2009
(Continued)

*Primary Examiner* — Adolf Dsouza
(74) *Attorney, Agent, or Firm* — McDermott Will & Emery LLP

(57) ABSTRACT

A modulating and demodulating section receives, from another radio device, a packet signal including at least position information of another vehicle in which the other radio device is mounted. A position information acquiring section acquires position information of the vehicle in which the radio device is mounted. An estimating section estimates a time taken for the vehicle and the other vehicle to encounter each other on the basis of these two pieces of position information. A deriving section derives a distance between the vehicle and the other vehicle on the basis of these two pieces of position information. A determining section provides notification of an encounter with the other vehicle in a case where the estimated time is equal to or less than a first threshold value or in a case where the derived distance is equal to or less than a second threshold value.

1 Claim, 11 Drawing Sheets

(56) References Cited

U.S. PATENT DOCUMENTS

| | | | |
|---|---|---|---|
| 2013/0110316 | A1 | 5/2013 | Ogawa |
| 2015/0057834 | A1 | 2/2015 | Morimoto |

FOREIGN PATENT DOCUMENTS

| | | | |
|---|---|---|---|
| JP | 2012-022671 | A | 2/2012 |
| WO | 2011/013238 | A1 | 2/2011 |
| WO | 2013/153660 | A1 | 10/2013 |

* cited by examiner

| CONDITION (300) | STATE (302) |
|---|---|
| TIME ≤ FIRST THRESHOLD VALUE | APPROACHING |
| DISTANCE ≤ SECOND THRESHOLD VALUE | APPROACHING |
| OTHER CASES | NON-APPROACHING |

84

| CONDITION (310) | PROCESS (312) |
| --- | --- |
| APPROACHING FROM FRONT | MAKE FIRST THRESHOLD VALUE AND SECOND THRESHOLD VALUE SMALL |
| APPROACHING AT INTERSECTION AHEAD | MAKE FIRST THRESHOLD VALUE AND SECOND THRESHOLD VALUE LARGE |
| APPROACHING FROM BEHIND | MAKE FIRST THRESHOLD VALUE AND SECOND THRESHOLD VALUE LARGE |

FIG. 10

| CONDITION (320) | PROCESS (322) |
|---|---|
| COLOR OF LIGHT IS BLUE | MAKE FIRST THRESHOLD VALUE AND SECOND THRESHOLD VALUE LARGE |
| OTHER CASES | NOT CHANGED |

84

FIG. 11

| | | |
|---|---|---|
| | DRIVING THROUGH RED LIGHT | |

FIG. 12

| | | |
|---|---|---|
| | FAST CONTROLLING | |

FIG. 13

| | | |
|---|---|---|
| | CENTER DIVIDER EXISTING | |

RADIO DEVICE

CROSS-REFERENCE TO RELATED APPLICATION

This application is a Continuation Application of U.S. Ser. No. 14/668,624 filed Mar. 25, 2015, which claims priority to Japanese Patent Application No. 2014-223323, filed Oct. 31, 2014 and Japanese Patent Application No. 2014-070327, filed Mar. 28, 2014. The subject matter of each is incorporated herein by reference in entirety.

BACKGROUND

1. Technical Field

The present disclosure relates to a communication technique, and specifically to a radio device that receives a signal including specific information.

2. Description of the Related Art

An emergency vehicle passage support service prompts a driver to take evasive action to allow an emergency vehicle to pass in a case where the emergency vehicle is getting near to the vehicle of the driver. Approach of an emergency vehicle is estimated by calculation using the speed, position, and directions of movement of both vehicles (see, for example, WO 11/013238).

SUMMARY

However, WO 11/013238 needs further improvements.

In one general aspect, the techniques disclosed here feature a radio device that is mountable in a vehicle, including: a receiving section that receives, from another radio device, a packet signal including at least position information of another vehicle in which the other radio device is mounted; an acquiring section that acquires position information of the vehicle in which the radio device is mounted; an estimating section that estimates a time taken for the vehicle and the other vehicle to encounter each other on the basis of the position information acquired by the acquiring section and the position information included in the packet signal received by the receiving section; a deriving section that derives a distance between the vehicle and the other vehicle on the basis of the position information acquired by the acquiring section and the position information included in the packet signal received by the receiving section; and a determining section that provides notification of an encounter with the other vehicle in a case where the time estimated by the estimating section is equal to or less than a first threshold value or in a case where the distance derived by the deriving section is equal to or less than a second threshold value.

These general and specific aspects may be implemented using a system, a method, and a computer program, and any combination of systems, methods, and computer programs.

According to the aspect, it is possible to achieve further improvements.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 is a view illustrating a data structure of a table held in a determining section according to Embodiment 3 of the present disclosure;

FIG. 11 is a view illustrating information included in a packet signal according to Embodiment 4 of the present disclosure;

FIG. 12 is a view illustrating information included in a packet signal according to Embodiment 5 of the present disclosure;

FIG. 13 is a view illustrating information included in a packet signal according to Embodiment 6 of the present disclosure;

DETAILED DESCRIPTION

Figure 1:
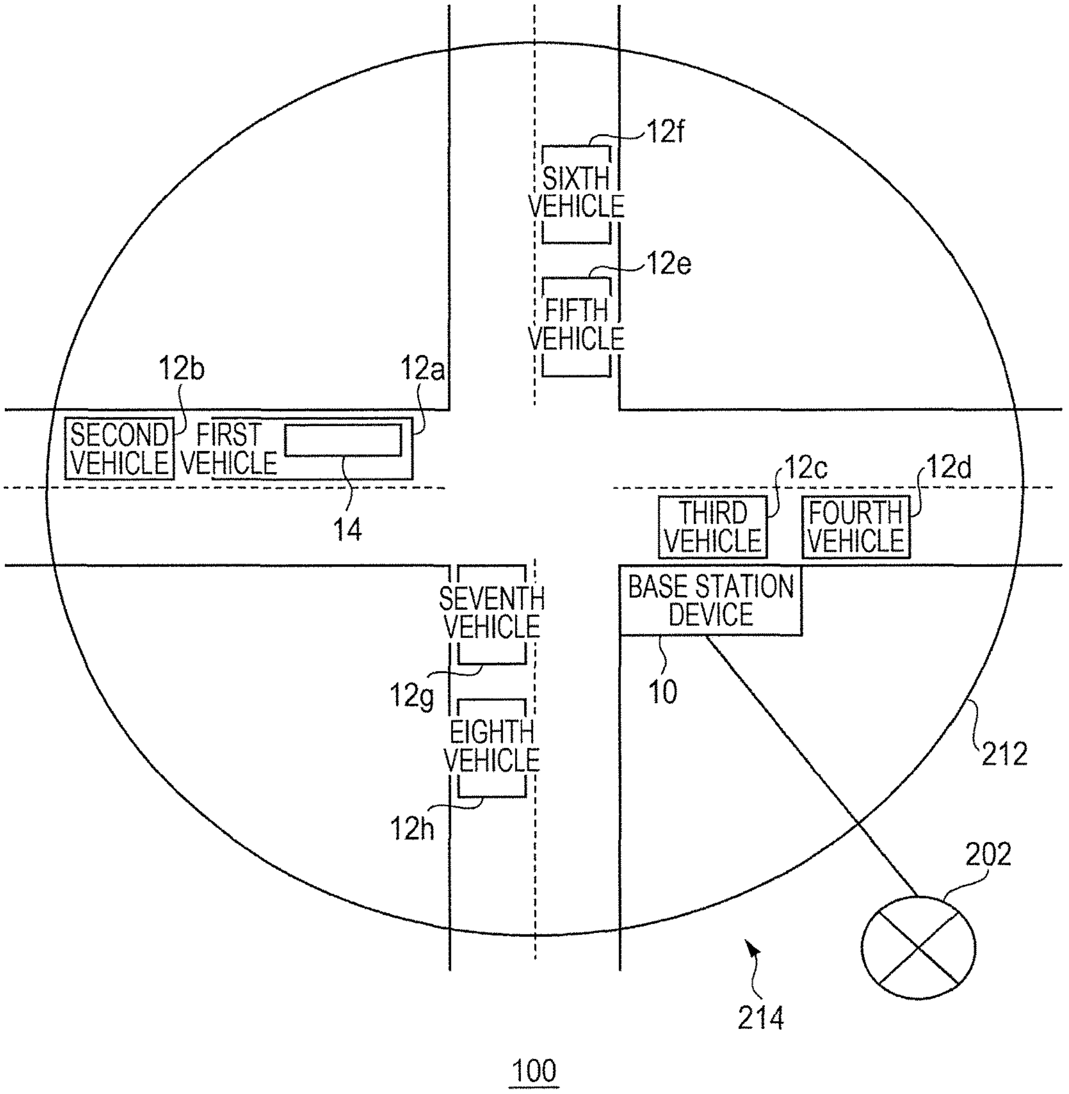
FIG. 1 illustrates a configuration of a communication system according to Embodiment 1 of the present disclosure.

Underlying Knowledge Forming the Basis of the Present Disclosure

In WO 11/013238, driving support is performed in a case where the vehicle and the emergency vehicle are in such a positional relationship that the vehicle and the emergency vehicle are going to encounter each other and where a time taken for the vehicle and the emergency vehicle to encounter each other is within a predetermined time. However, in a case where the relative speed between the vehicle and the emergency vehicle is slow, driving support does not occur undesirably regardless of the approach of the vehicle and the emergency vehicle.

In view of this, the inventors of the present invention considered the following improvement in order to solve the above problem.

A radio device according to one aspect of the present disclosure is a radio device that is mountable in a vehicle, including: a receiving section that receives, from another radio device, a packet signal including at least position information of another vehicle in which the other radio device is mounted; an acquiring section that acquires position information of the vehicle in which the radio device is mounted; an estimating section that estimates a time taken for the vehicle and the other vehicle to encounter each other on the basis of the position information acquired by the acquiring section and the position information included in the packet signal received by the receiving section; a deriving section that derives a distance between the vehicle and the other vehicle on the basis of the position information acquired by the acquiring section and the position information included in the packet signal received by the receiving section; and a determining section that provides notification of an encounter with the other vehicle in a case where the time estimated by the estimating section is equal to or less than a first threshold value or in a case where the distance derived by the deriving section is equal to or less than a second threshold value.

According to this aspect, a driver is notified of an encounter on the basis of a time before the encounter with the other vehicle and a distance to the other vehicle. Therefore, the driver can be accurately notified of the approach of the other vehicle.

In this aspect, the radio device may be arranged to further include a storage section that stores therein position information of an intersection. In a case where there is an intersection between the vehicle and the other vehicle, the deriving section may derive, as the distance between the vehicle and the other vehicle, a distance between the vehicle and the intersection on the basis of the position information acquired by the acquiring section and the position information stored in the storage section.

According to this aspect, in a case where there is an intersection between a vehicle and another vehicle, the distance to the other vehicle is shortened. It is therefore possible to improve the probability of notification.

In this aspect, the radio device may be arranged such that the packet signal received by the receiving section also includes information concerning a travelling direction of the other vehicle; the acquiring section also acquires information concerning the travelling direction of the other vehicle; and the determining section estimates a relative direction between the vehicle and the other vehicle at the time of the encounter with the other vehicle on the basis of the information concerning the travelling direction acquired by the acquiring section and the information concerning the travelling direction included in the packet signal received by the receiving section, and then adjusts the first threshold value and the second threshold value in accordance with the estimated relative direction.

According to this aspect, the first threshold value and the second threshold value are adjusted in accordance with the relative direction. It is therefore possible to perform notification in accordance with the situation.

In this aspect, the radio device may be arranged to further include an accepting section that accepts information concerning a color of a traffic light provided in a travelling direction of the vehicle. The determining section may adjust the first threshold value and the second threshold value in accordance with the information concerning the color of the traffic light accepted by the accepting section.

According to this aspect, the first threshold value and the second threshold value are adjusted in accordance with the color of the traffic light. It is therefore possible to perform notification in accordance with the color of the traffic light.

In this aspect, the radio device may be arranged to further include an obtaining section that obtains a trigger to change lanes of which the vehicle in which the radio device is mounted is running. The determining section may provide notification in a case where the obtaining section obtains the trigger.

According to this aspect, in a case where the trigger is acquired, notification provides. This reduces the number of erroneous determinations. Therefore, even in a case where a driver is notified of the approach of a vehicle other than an emergency vehicle, the driver can be accurately notified of the approach of the vehicle.

Embodiment 1

The premise of the present disclosure is described before specific embodiments of the present disclosure are described. Embodiment 1 of the present disclosure relates to a communication system in which inter-vehicle communication is performed between terminal devices mounted in vehicles, and road-to-vehicle communication is performed from a base station device provided at an intersection or the like to a terminal device. Such a communication system is also called ITS (Intelligent Transport Systems). The communication system uses an access control function called CSMA/CA (Carrier Sense Multiple Access with Collision Avoidance) in a similar manner to wireless LAN (Local Area Network) that is compliant with a standard such as IEEE802.11. Therefore, an identical radio channel is shared by a plurality of terminal devices. Meanwhile, in an ITS, it is necessary to transmit information to an indefinitely large number of terminal devices. In order to efficiently perform such transmission, the present communication system broadcasts a packet signal.

That is, a terminal device broadcasts, as inter-vehicle communication, a packet signal in which information such as the speed, position, or the like of a vehicle is stored. Another terminal device receives the packet signal and recognizes the approach or the like of the vehicle on the basis of the information. In order to reduce interference between road-to-vehicle communication and inter-vehicle communication, a base station device repeatedly specifies a frame including a plurality of sub-frames. The base station device selects, for road-to-vehicle communication, any of the plurality of sub-frames, and broadcasts a packet signal in which control information and the like are stored during a period corresponding to the start portion of the selected sub-frame.

The control information includes information concerning a period (hereinafter referred to as “road-to-vehicle transmission period”) for broadcast transmission of the packet signal by the base station device. A terminal device specifies a road-to-vehicle transmission period on the basis of the control information and then broadcasts a packet signal by the CSMA method during a period (hereinafter referred to as “inter-vehicle transmission period”) other than the road-to-vehicle transmission period. As a result, the road-to-vehicle communication and the inter-vehicle communication are time-division multiplexed. Note that a terminal device that cannot receive the control information from the base station device, i.e., a terminal device that is out of an area formed by the base station device transmits a packet signal by the CSMA method irrespective of the configuration of the frame.

A terminal device receives a packet signal from another terminal device and detects the approach of the other vehicle in which the terminal device is mounted on the basis of information included in the packet signal concerning the position of the other vehicle. Upon detecting the approach of the other vehicle, the terminal device notifies the driver of the approach. In addition, in emergency vehicle passage support, in a case where the vehicle is likely to approach an emergency vehicle, the driver is notified of the approach. More specifically, in emergency vehicle passage support, it is speculated that information is provided in a case where a direct distance between the vehicle and the emergency vehicle is within 300 m. For example, the driver is notified of the presence of the emergency vehicle by displaying, on a map of a car navigation system mounted in the vehicle, an icon of the emergency vehicle at a position where the emergency vehicle is present.

Furthermore, in order to make the support provided to the driver more effective, emergency vehicle approach information is provided in a case where the vehicle and the emergency vehicle encounter (cross, pass, drive past) each other. For example, the driver is notified of the approach of the emergency vehicle by displaying, on the navigation system, an icon that is more emphasized than the aforementioned icon and a direction (e.g., from behind, from the front, from the right, from the left) from which the emergency vehicle approaches. The following focuses on a timing of occurrence of such support.

The information is provided to the driver in a case where it is determined, on the basis of the positions, speed, and travelling directions of the vehicle and the emergency vehicle, that the vehicle and the emergency vehicle are going to encounter each other within a predetermined time. According to such a process, in a case where the relative speed between the vehicle and the emergency vehicle is slow, there is a possibility that no support will be provided even if the vehicle and the emergency vehicle are approaching each other, as described above. In order to cope with this, the terminal device according to the present embodiment provides information to the driver in a case where the distance between the vehicle and the emergency vehicle is a predetermined distance or shorter even if the time to the encounter is longer than the predetermined time.

FIG. 1 illustrates a configuration of a communication system 100 according to Embodiment 1 of the present disclosure. FIG. 1 illustrates a case where one intersection is viewed from above. The communication system 100 includes a base station device 10, a first vehicle 12*a*, a second vehicle 12*b*, a third vehicle 12*c*, a fourth vehicle 12*d*, a fifth vehicle 12*e*, a sixth vehicle 12*f*, a seventh vehicle 12*g*, and an eighth vehicle 12*h*, which are collectedly referred to as vehicles 12, and a network 202. A terminal device 14 is mounted in each of the vehicles 12, although the terminal device 14 is illustrated only in the first vehicle 12*a* in FIG. 1. An area 212 is formed around the base station device 10, and an outside area 214 is formed outside the area 212.

As illustrated in FIG. 1, a road running in the horizontal direction in FIG. 1, i.e., in a left-right direction in FIG. 1 and a road running in the vertical direction in FIG. 1, i.e., in a top-bottom direction in FIG. 1 cross at a central part of FIG. 1. In FIG. 1, the upper side corresponds to “north”, the left side corresponds to “west”, the lower side corresponds to “south”, and the right side corresponds to “east”. A part at which these two roads cross each other is an “intersection”. The first vehicle 12*a* and the second vehicle 12*b* are running from left to right, and the third vehicle 12*c* and the fourth vehicle 12*d* are running from right to left. The fifth vehicle 12*e* and the sixth vehicle 12*f* are running from top to bottom, and the seventh vehicle 12*g* and the eighth vehicle 12*h* are running from bottom to top.

In the communication system 100, the base station device 10 is fixedly installed at the intersection. The base station device 10 controls communication between the terminal devices. The base station device 10 repeatedly generates a frame including a plurality of sub-frames on the basis of a signal received from a GPS (Global Positioning System) satellite (not illustrated) or a frame formed by another base station device 10 (not illustrated). It is specified at the start portion of each of the sub-frames that a road-to-vehicle transmission period can be set.

The base station device 10 selects a sub-frame in which no road-to-vehicle transmission period is set by another base station device 10 from the plurality of sub-frames included in the frame. The base station device 10 sets a road-to-vehicle transmission period at the start portion of the selected sub-frame. The base station device 10 broadcasts a packet signal during the set road-to-vehicle transmission period. A plurality of packet signals may be broadcasted during the road-to-vehicle transmission period. The packet signal includes, for example, traffic accident information, traffic jam information, and traffic signal information. Note that the packet signal also includes information concerning a timing at which the road-to-vehicle transmission period is set and control information concerning the frame.

The terminal device 14 is mounted in each of the vehicles 12 as described above and can therefore be transported. Upon reception of the packet signal from the base station device 10, the terminal device 14 estimates that the terminal device 14 is within the area 212. In a case where the terminal device 14 is within the area 212, the terminal device 14 generates a frame on the basis of control information included in the packet signal, especially information concerning a timing at which the road-to-vehicle transmission period is set and information concerning the frame. As a result, the frame generated in each of the plurality of terminal devices 14 is in sync with the frame generated in the base station device 10. The terminal device 14 broadcasts a packet signal during a inter-vehicle transmission period that is different from the road-to-vehicle transmission period. During the inter-vehicle transmission period, CSMA/CA is performed. Meanwhile, in a case where the terminal device 14 estimates that the terminal device 14 is within the outside area 214, the terminal device 14 broadcasts a packet signal by performing CSMA/CA irrespective of the configuration of the frame.

The terminal device 14 recognizes an approach of a another vehicle 12 in which another terminal device 14 is mounted on the basis of a packet signal from the other terminal device 14. Specifically, in a case where one of the vehicles 12, for example, the first vehicle 12*a* is the vehicle and where another one of the vehicles 12, for example, the eighth vehicle 12*h* is an emergency vehicle, the terminal device 14 mounted in the first vehicle 12*a* notifies a driver of an encounter with the emergency vehicle.

Figure 2:
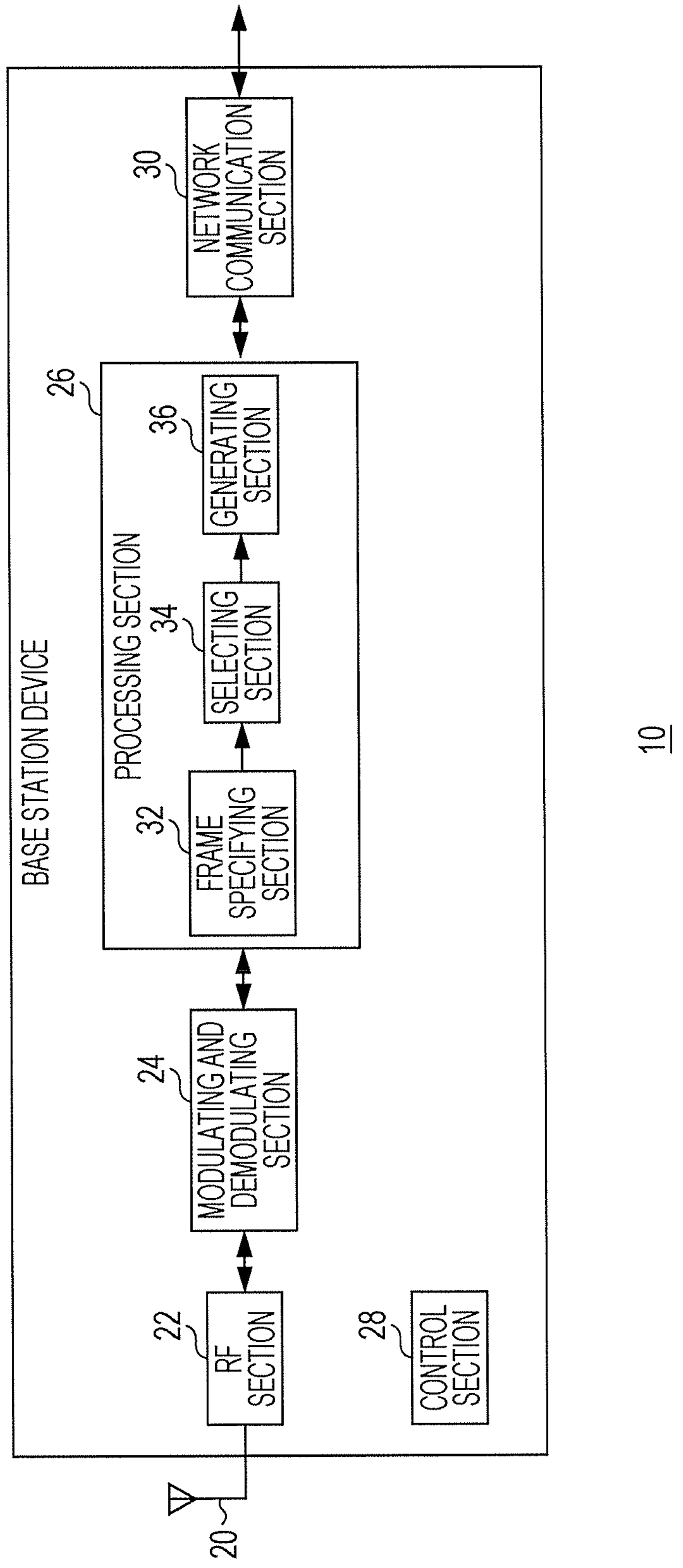
FIG. 2 is a view illustrating a configuration of a base station device of FIG. 1.

FIG. 2 illustrates a configuration of the base station device 10. The base station device 10 includes an antenna 20, an RF section 22, a modulating and demodulating section 24, a processing section 26, a control section 28, and a network communication section 30. The processing section 26 includes a frame specifying section 32, a selecting section 34, and a generating section 36.

The RF section 22 receives, as a receiving process, a packet signal from the terminal device 14 or another base station device 10 (not illustrated) via the antenna 20. The RF section 22 converts the frequency of the received wireless frequency packet signal to generate a baseband packet signal. Furthermore, the RF section 22 supplies the baseband packet signal to the modulating and demodulating section 24. In general, the baseband packet signal is made up of an in-phase component and an orthogonal component, and therefore two signal lines should be illustrated. However, for clarity in FIG. 2, only one signal line is illustrated. The RF section 22 includes an LNA (Low Noise Amplifier), a mixer, an AGC, and an A/D converter section.

The RF section 22 converts, as a transmitting process, the frequency of the baseband packet signal supplied from the modulating and demodulating section 24 to generate a wireless frequency packet signal. Furthermore, the RF section 22 transmits the wireless frequency packet signal via the antenna 20 during the road-to-vehicle transmission period. The RF section 22 includes a PA (Power Amplifier), a mixer, and a D/A converter section.

The modulating and demodulating section 24 demodulates, as a receiving process, the baseband packet signal from the RF section 22. Furthermore, the modulating and demodulating section 24 supplies a demodulation result to the processing section 26. Moreover, the modulating and demodulating section 24 demodulates, as a transmitting process, data from the processing section 26. Furthermore, the modulating and demodulating section 24 supplies, as a baseband packet signal, a demodulation result to the RF section 22. Since the communication system 100 supports an OFDM (Orthogonal Frequency Division Multiplexing) demodulation method, the modulating and demodulating section 24 also performs, as a receiving process, FFT (Fast Fourier Transform) and performs, as a transmitting process, IFFT (Inverse Fast Fourier Transform).

The frame specifying section 32 receives a signal from a GPS satellite (not illustrated) and acquires the current time on the basis of the received signal. Note that acquisition of the current time can be performed by using a known art, and is therefore not described here. The frame specifying section 32 generates a plurality of frames on the basis of the information on the time. For example, the frame specifying section 32 generates 10 frames of "100 msec" by dividing a period of "1 sec" into 10 sections on the basis of a timing indicated in the information on the time. By repeating such a process, it is specified that the frame is repeated. Note that the frame specifying section 32 may detect control information from the demodulation result and generate a frame on the basis of the detected control information. Such a process corresponds to generating a frame that is in sync with a timing of a frame generated by another base station device 10.

Figure 3:
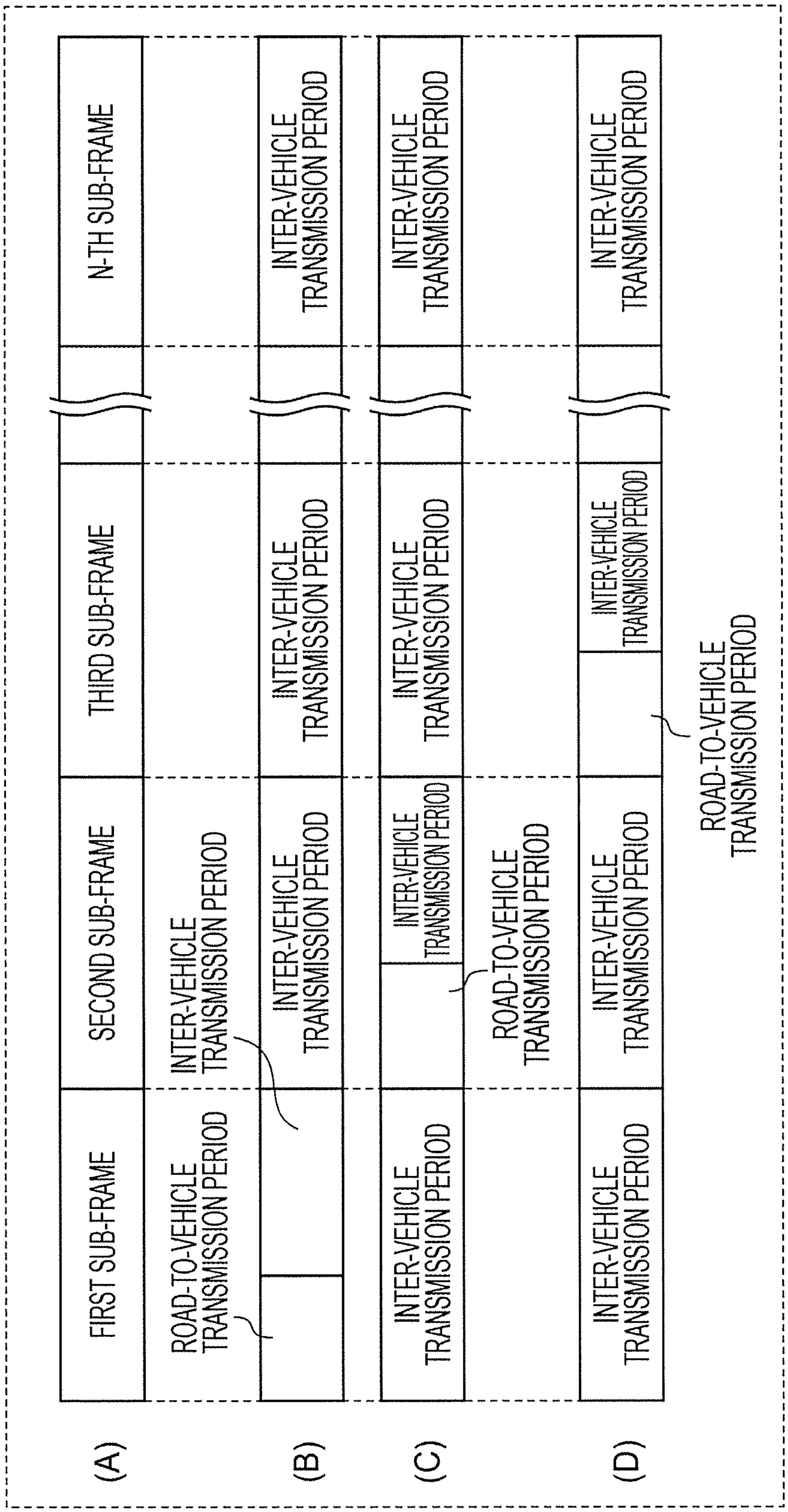
FIG. 3 is a view illustrating a format of a frame specified in the communication system of FIG. 1.

FIG. 3 illustrates a format of a frame specified in the communication system 100. FIG. 3 (A) illustrates a configuration of the frame. The frame is made up of N sub-frames, i.e., the first sub-frame through the N-th sub-frame. That is, it can be said that the frame is formed by time-multiplexing a plurality of sub-frames that can be used for broadcasting of a packet signal by the terminal device 14. For example, in a case where the length of the frame is 100 msec and where N is 8, sub-frames each having a length of 12.5 msec are specified. N may be a number other than 8. FIGS. 3B through 3D are described later. The following description returns to FIG. 2.

The selecting section 34 selects a sub-frame in which a road-to-vehicle transmission period should be set from the plurality of sub-frames included in the frame. Specifically, the selecting section 34 accepts the frame specified by the frame specifying section 32. Furthermore, the selecting section 34 accepts an instruction concerning the selected sub-frame via an interface (not illustrated). The selecting section 34 selects a sub-frame corresponding to the instruction. In a separate process, the selecting section 34 may automatically select a sub-frame. In this case, the selecting section 34 receives a demodulation result from another base station device 10 or the terminal device 14 (not illustrated) via the RF section 22 and the modulating and demodulating section 24. The selecting section 34 extracts the demodulation result received from the other base station device 10. The selecting section 34 specifies a sub-frame for which the demodulation result has not been accepted by specifying a sub-frame for which the demodulation result has been accepted.

This corresponds to specifying a sub-frame in which a road-to-vehicle transmission period has not been set by another base station device 10, i.e., a unused sub-frame. In a case where there are a plurality of unused sub-frames, the selecting section 34 randomly selects one sub-frame. In a case where there is no unused sub-frame, i.e., in a case where each of the plurality of sub-frames is being used, the selecting section 34 acquires reception electric power corresponding to the demodulation result and preferentially selects a sub-frame of small reception electric power.

FIG. 3 (B) illustrates a configuration of a frame generated by a first base station device 10*a* (not illustrated). The first base station device 10*a* sets a road-to-vehicle transmission period at the start portion of a first sub-frame. Furthermore, the first base station device 10*a* sets a inter-vehicle transmission period after the road-to-vehicle transmission period in the first sub-frame. The inter-vehicle transmission period is a period in which the terminal device 14 can broadcast a packet signal. That is, it is specified that the first base station device 10*a* can broadcast a packet signal during the road-to-vehicle transmission period, which is the start portion of the first sub-frame, and the terminal device 14 can broadcast a packet signal during a inter-vehicle transmission period other than the road-to-vehicle transmission period in the first sub-frame. Furthermore, the first base station device 10*a* sets only a inter-vehicle transmission period in the second sub-frame through the N-th sub-frame.

FIG. 3 (C) illustrates a configuration of a frame generated by a second base station device 10*b* (not illustrated). The second base station device 10*b* sets a road-to-vehicle transmission period at the start of a second sub-frame. Furthermore, the second base station device 10*b* sets a inter-vehicle transmission period at the latter stage of the road-to-vehicle transmission period in the second sub-frame, the first sub-frame, and the third sub-frame through the N-th sub-frame. FIG. 3 (D) illustrates a configuration of a frame generated by a third base station device 10*c* (not illustrated). The third base station device 10*c* sets a road-to-vehicle transmission period at the start portion of the third sub-frame. Furthermore, the third base station device 10*c* sets a inter-vehicle transmission period at the latter stage of the road-to-vehicle transmission period in the third sub-frame, the first sub-frame, the second sub-frame, and the fourth sub-frame through the N-th sub-frame. In this way, the plurality of base station devices 10 select different sub-frames and set a road-to-vehicle transmission period at the start of the selected sub-frames. The following description returns to FIG. 2. The selecting section 34 supplies a number of the selected sub-frame to the generating section 36.

The generating section 36 receives the number of the sub-frame from the selecting section 34. The generating section 36 sets a road-to-vehicle transmission period in the sub-frame having the received sub-frame number, and generates a packet signal that should be broadcasted in the road-to-vehicle transmission period. In a case where a plurality of packet signals are transmitted during one road-to-vehicle transmission period, the generating section 36 generates these packet signals. A packet signal is made up of control information and a payload. The control information includes, for example, a number of a sub-frame for which a road-to-vehicle transmission period has been set. The payload includes, for example, traffic accident information, traffic jam information, and traffic signal information. These data are acquired from the network 202 (not illustrated) by the network communication section 30. The processing section 26 causes a packet signal to be broadcast to the modulating and demodulating section 24 and the RF section 22 during the road-to-vehicle transmission period. The control section 28 controls the process of the whole base station device 10.

This configuration is realized by a CPU, memory, and other LSI of any computer in the case of hardware and is realized by a program loaded to memory in the case of software. In FIG. 2, functional blocks realized by cooperation of these components are illustrated. Therefore, it is understood by a person skilled in the art that these functional blocks are realized in various forms by hardware only or by a combination of hardware and software.

Figure 4:
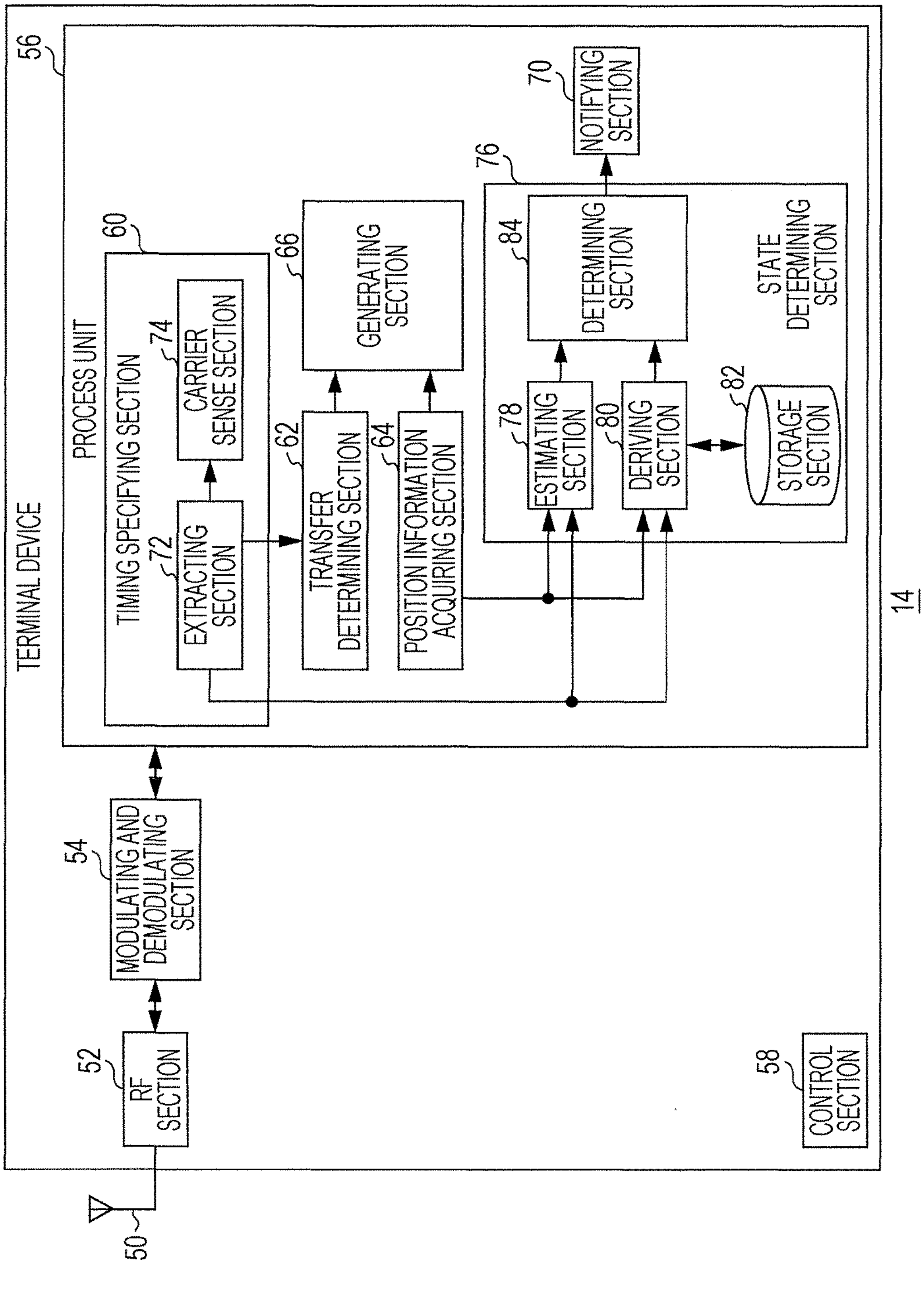
FIG. 4 is a view illustrating a configuration of a terminal device of FIG. 1.

FIG. 4 illustrates a configuration of the terminal device 14. The terminal device 14 includes an antenna 50, an RF section 52, a modulating and demodulating section 54, a processing section 56, and a control section 58. The processing section 56 includes a timing specifying section 60, a transfer determining section 62, a position information acquiring section 64, a generating section 66, a state determining section 76, and a notifying section 70. The timing specifying section 60 includes an extracting section 72 and a carrier sense section 74. The state determining section 76 includes an estimating section 78, a deriving section 80, a storage section 82, and a determining section 84. The terminal device 14 can be mounted in each of the vehicles 12 as described above. The vehicle 12 may be an emergency vehicle. The antenna 50, the RF section 52, and the modulating and demodulating section 54 perform similar processes to the antenna 20, the RF section 22, and the modulating and demodulating section 24 of FIG. 2. The following discusses mainly differences.

The modulating and demodulating section 54 and the processing section 56 receive, in a receiving process, a packet signal from the other terminal device 14 or the base station device 10 (not illustrated). As described above, the modulating and demodulating section 54 and the processing section 56 receive a packet signal from the base station device 10 during a road-to-vehicle transmission period, and receive a packet signal from another terminal device 14 during a inter-vehicle transmission period. The packet signal from the other terminal device 14 includes at least the position, the traveling direction, the speed of movement, etc. (hereinafter referred to as "position information") of another vehicle 12 in which the other terminal device 14 is mounted. Acquisition of the position information of the other terminal device 14 is performed by using a prior art, and is therefore not described here.

Note that the packet signal includes type information indicative of the type of the vehicle 12 in which the terminal device 14 is mounted. In particular, in a case where another vehicle 12 is an emergency vehicle, type information included in a packet signal transmitted from another terminal device 14 mounted in the emergency vehicle indicates an emergency vehicle.

In a case where a demodulation result supplied from the modulating and demodulating section 54 is a packet signal from a base station device 10 (not illustrated), the extracting section 72 specifies a timing of a sub-frame in which a road-to-vehicle transmission period is provided. In this case, the extracting section 72 estimates that the terminal device 14 is within the area 212 of FIG. 1. The extracting section 72 generates a frame on the basis of the timing of the sub-frame and the contents of a message header of the packet signal, specifically, the contents of the length of the road-to-vehicle transmission period. Note that generation of the frame is performed in the same manner as the frame specifying section 32, and is therefore not explained repeatedly. As a result, the extracting section 72 generates a frame that is in sync with the frame generated in the base station device 10. In a case where a broadcasting source of the packet signal is another terminal device 14, the extracting section 72 omits a process of generating the synchronized frame, but extracts position information and type information included in the packet signal. Since the following discusses emergency vehicle passage support, the type information indicates an emergency vehicle in the following description. The extracting section 72 supplies the position information of the emergency vehicle to the state determining section 76.

Meanwhile, in a case where the packet signal from the base station device 10 is not received, the extracting section 72 estimates that the terminal device 14 is within the outside area 214 of FIG. 1. In a case where the extracting section 72 estimates that the terminal device 14 is within the area 212, the extracting section 72 selects a inter-vehicle transmission period. In a case where the extracting section 72 estimates that the terminal device 14 is within the outside area 214, the extracting section 72 selects a timing that is not related to the configuration of the frame. In a case where the extracting section 72 selects the inter-vehicle transmission period, the extracting section 72 supplies information concerning timings of the frame and the sub-frame and the inter-vehicle transmission period to the carrier sense section 74. In a case where the extracting section 72 selects a timing that is not related to the configuration of the frame, the extracting section 72 instructs the carrier sense section 74 to perform carrier sense.

The carrier sense section 74 accepts the information concerning timings of the frame and the sub-frame and the inter-vehicle transmission period from the extracting section 72. The carrier sense section 74 determines a transmission timing by starting CSMA/CA during the inter-vehicle transmission period. Meanwhile, in a case where the carrier sense section 74 is instructed by the extracting section 72 to perform carrier sense that is not related to the configuration of the frame, the carrier sense section 74 determines a transmission timing by performing CSMA/CA without considering the configuration of the frame. The carrier sense section 74 notifies the modulating and demodulating section 54 and the RF section 52 of the determined transmission timing and causes a packet signal to be broadcast.

The transfer determining section 62 controls transfer of the control information. The transfer determining section 62 extracts information to be transferred out of the control information. The transfer determining section 62 generates the information to be transferred on the basis of the extracted information. Description of this process is omitted. The transfer determining section 62 supplies the information to be transferred, i.e., part of the control information to the generating section 66.

The position information acquiring section 64 includes a GPS receiver, a gyroscope, a vehicle speed sensor, and the like (not illustrated), and acquires the position, the travelling direction, the speed of movement etc. (collectively referred to as "position information" as described above) of the vehicle 12 (not illustrated), i.e., the vehicle 12 in which the terminal device 14 is mounted on the basis of data supplied from the GPS receiver, the gyroscope, the vehicle speed sensor, and the like. The position is indicated by latitude and longitude. The acquisition of the position, the travelling direction, the speed of movement etc. can be performed by using a known art, and is therefore not explained here. The position information acquiring section 64 supplies the position information to the generating section 66 and the state determining section 76.

The generating section 66 accepts the position information from the position information acquiring section 64 and accepts part of the control information from the transfer determining section 62. The generating section 66 generates a packet signal including these pieces of information and broadcasts the generated packet signal via the modulating and demodulating section 54, the RF section 52, and the antenna 50 at the timing determined by the carrier sense section 74. This corresponds to inter-vehicle communication. The packet signal generated by the generating section 66 includes type information, and this type information indicates, for example, a general vehicle.

The estimating section 78 accepts the position information from the transfer determining section 62 and accepts the position information from the extracting section 72. The estimating section 78 estimates a time taken for the vehicle 12 and the emergency vehicle to encounter each other on the basis of the position information of the emergency vehicle and the position information of the vehicle 12. Estimation of the time can be performed by using a known art. For example, the estimating section 78 estimates, as a first step, whether or not the vehicle 12 and the emergency vehicle encounter each other on the basis of the positions and the travelling directions of the vehicle 12 and the emergency vehicle. In a case where it is estimated that the vehicle 12 and the emergency vehicle encounter each other, the estimating section 78 estimates, as a second step, a time taken for the vehicle 12 and the emergency vehicle to encounter each other on the basis of the speed of movement. The estimating section 78 supplies the estimates time to the determining section 84.

The storage section 82 stores therein road information concerning a road on which the vehicle 12 is running. The road information includes position information of an intersection. The road information is a known art. The road information may be stored in a car navigation system mounted in the vehicle 12 instead of being stored in the terminal device 14. The deriving section 80 accepts the position information from the transfer determining section 62 and accepts the position information from the extracting section 72 in the same manner as the estimating section 78. The deriving section 80 derives a distance between the vehicle and the emergency vehicle on the basis of the position information of the emergency vehicle and the position information of the vehicle 12. The deriving section 80 may derive a direct distance between the vehicle and the emergency vehicle or may derive a route distance between the vehicle and the emergency vehicle by using the road information stored in the storage section 82.

Figure 5:
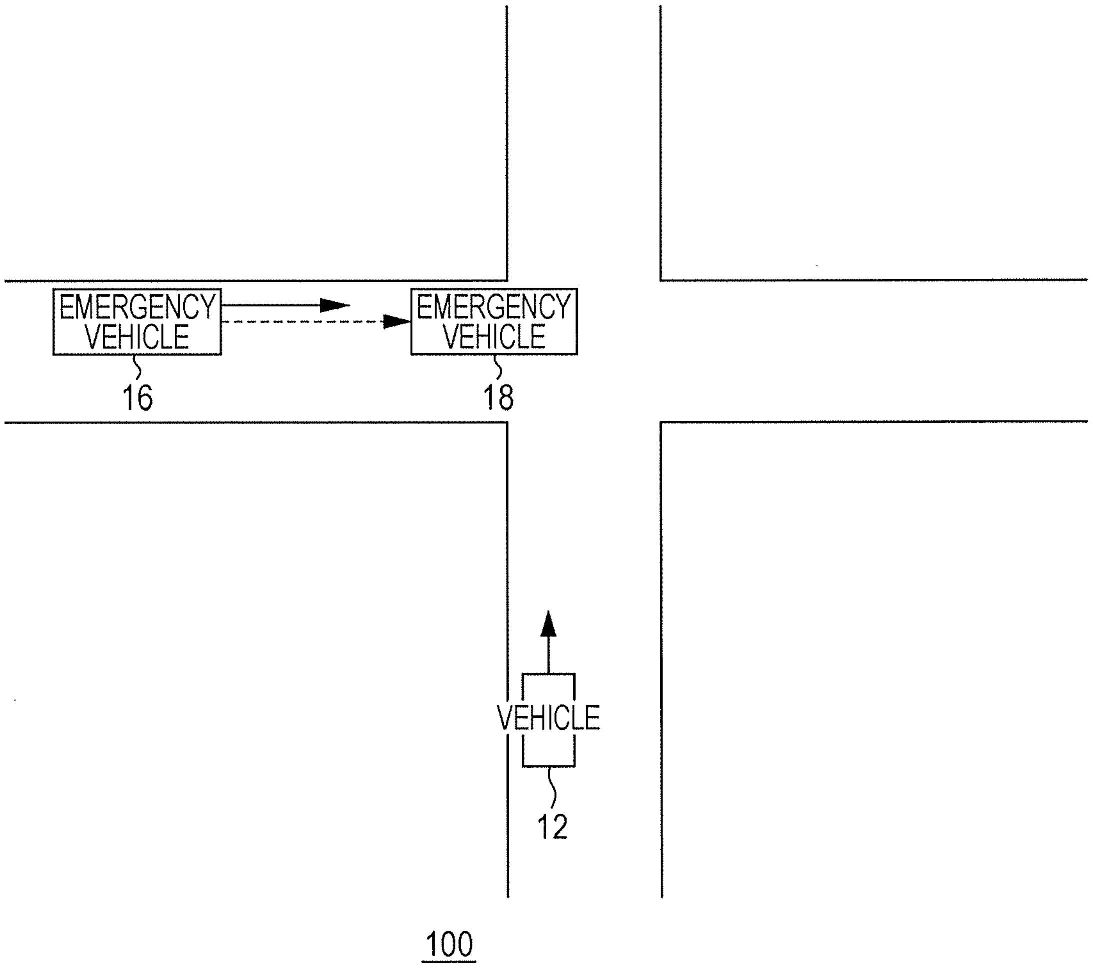
FIG. 5 is a view illustrating an outline of a process performed by the communication system of FIG. 1.

In a case where the route distance is derived and where there is an intersection between the vehicle and the emergency vehicle, the deriving section 80 derives a distance between the vehicle and the intersection on the basis of the position of the vehicle and the position of the intersection as the distance between the vehicle and the emergency vehicle. This corresponds to reading the distance between the vehicle and the emergency vehicle as the distance between the vehicle and the intersection in a case where the vehicle and the emergency vehicle are in such a positional relationship that the vehicle and the emergency vehicle cross each other. FIG. 5 illustrates an outline of processes performed by the communication system 100. The vehicle 12 in FIG. 5 corresponds to the vehicle and is running from bottom to top, whereas the emergency vehicle 16 is running from left to right. The travelling directions of the vehicle 12 and the emergency vehicle 16 cross at an intersection. Therefore, it is assumed that the position of the emergency vehicle 16 is the position of a hypothetical emergency vehicle 18. The deriving section 80 derives the distance between the vehicle 12 and the hypothetical emergency vehicle 18. The following description returns to FIG. 4. The distance between the vehicle and the emergency vehicle is made shorter than the actual distance by such a process. The deriving section 80 supplies the derived distance to the determining section 84.

Figures 6, 7:
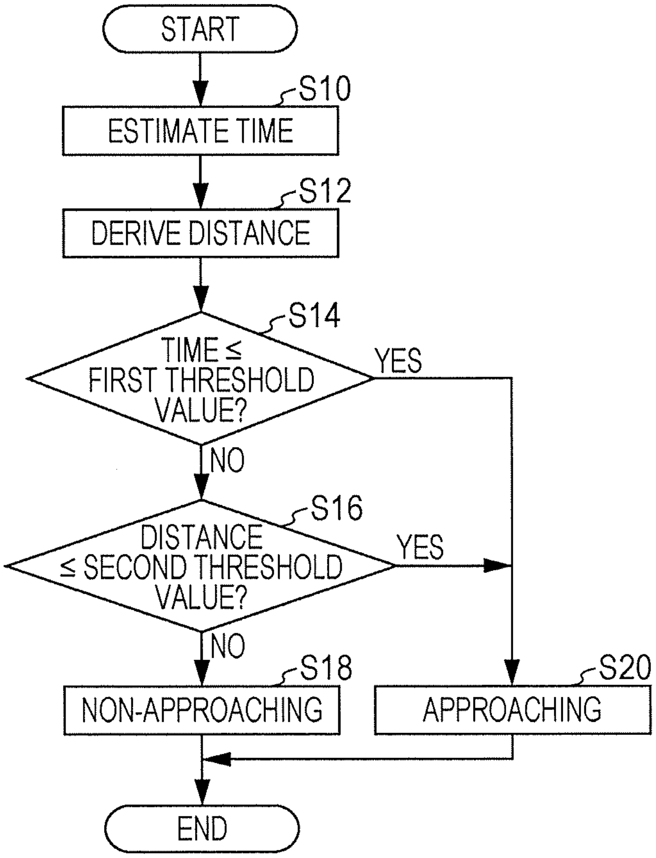
FIG. 6 is a view illustrating a data structure of a table held in a determining section of FIG. 4.
FIG. 7 is a flow chart showing a determining procedure performed by the terminal device of FIG. 4.

The determining section 84 accepts the time from the estimating section 78 and accepts the distance from the deriving section 80. In a case where the time estimated by the estimating section 78 is equal to or less than a first threshold value or in a case where the distance derived by the deriving section 80 is equal to or less than a second threshold value, the determining section 84 determines that the vehicle is going to encounter the emergency vehicle. In the other cases, the determining section 84 determines that there will be no encounter with the emergency vehicle. The first threshold value and the second threshold value are determined in advance by simulation calculation, experiments, or the like. FIG. 6 illustrates a data structure of a table held in the determining section 84. As illustrated in FIG. 6, the table includes a condition column 300 and a state column 302. In a case where a condition shown in the condition column 300 is satisfied, it is determined that the present state is a state shown in the state column 302. In the table, "APPROACHING" corresponds to "encounter" described above, and "NON-APPROACHING" corresponds to "no encounter" described above.

This means that support occurs in a case where the time before encounter is equal to or less than the first threshold value and that support also occurs in a case where the time before encounter is longer than the first threshold value but the distance between the vehicle and the emergency vehicle is equal to or less than the second threshold value. Furthermore, this means that support occurs in a case where the distance between the vehicle and the emergency vehicle is within the second threshold value and that support occurs in a case where the distance between the vehicle and the emergency vehicle is not within the second threshold value but the time before encounter is equal to or less than the first threshold value. The following description returns to FIG. 4.

The notifying section 70 causes the contents of the received packet signal to be displayed on a display (not illustrated). The notifying section 70 receives the result of determination from the determining section 84. The notifying section 70 notifies a driver of the result of determination via a monitor or a speaker. Furthermore, the notifying section 70 also notifies the driver of information included in the packet signal from the base station device 10 via the monitor or the speaker.

An operation of the communication system 100 having the above configuration is described below. FIG. 7 is a flow chart showing a determining procedure performed by the terminal device 14. The estimating section 78 estimates a time (S10). The deriving section 80 derives a distance (S12). In a case where the time is equal to or less than the first threshold value (YES in S14), the determining section 84 determines that the state is "approaching" (S20). Even in a case where the time is longer than the first threshold value (NO in S14), the determining section 84 determines that the state is "approaching" (S20) in a case where the distance is equal to or less than the second threshold value (YES in S16). In a case where the distance is longer than the second threshold value (NO in S16), the determining section 84 determines that the state is "non-approaching" (S18).

Figures 8, 9:
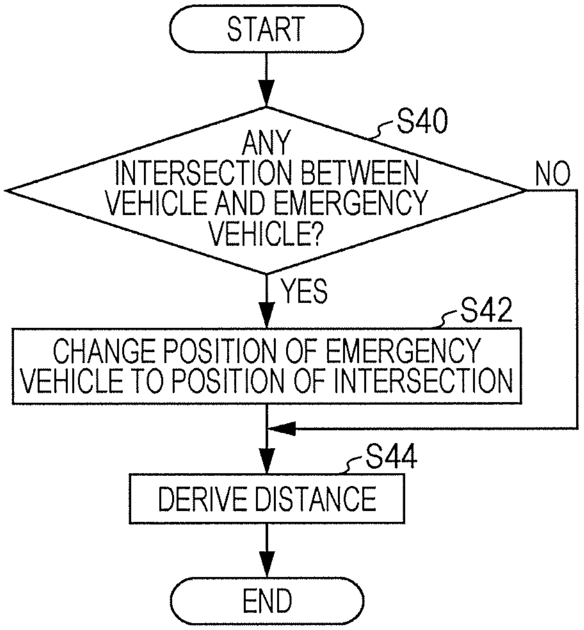
FIG. 8 is a flow chart showing a distance deriving procedure performed by the terminal device of FIG. 4.
FIG. 9 is a view illustrating a data structure of a table held in a determining section according to Embodiment 2 of the present disclosure.

FIG. 8 is a flow chart showing a distance deriving procedure performed by the terminal device 14. In a case where there is an intersection between the vehicle 12 and the emergency vehicle (YES in S40), the determining section 84 changes the position of the emergency vehicle to the position of the intersection (S42). Meanwhile, in a case where there is no intersection between the vehicle 12 and the emergency vehicle (NO in S40), Step 42 is skipped. The deriving section 80 derives a distance (S44).

According to the embodiment of the present disclosure, a driver is notified of an encounter on the basis of a time before encounter with an emergency vehicle and a distance to the emergency vehicle. It is therefore possible to accurately notify the driver of the approach of the emergency vehicle. Furthermore, since whether encounter occurs or not is determined by logical OR of two conditions concerning the time and the distance, the conditions can be made strict. Since the conditions are strict, the number of erroneous determinations can be reduced. Furthermore, in a case where there is an intersection between the vehicle and the emergency vehicle, the distance to the emergency vehicle is made shorter. This makes it possible to improve the probability of notification.

Embodiment 2

Next, Embodiment 2 of the present disclosure is described. Embodiment 2 also relates to a communication system that performs emergency vehicle passage support as in Embodiment 1. In Embodiment 1, whether the state is "approaching" or not is determined by comparing the time and the first threshold value and comparing the distance and the second threshold value. In particular, the first threshold value and the second threshold value are fixed values. A terminal device according to Embodiment 2 changes the first threshold value and the second threshold value in accordance with a direction from which an emergency vehicle approaches. For example, in a case where the emergency vehicle approaches from behind, a driver needs to pay attention to the back side, thereby making driving less safe than usual. It is therefore necessary to hurry up determination of approach, thereby allowing support to occur earlier. In a case where the emergency vehicle approaches from the front, movement of driver's gaze is small, and therefore the influence on driving is small. It is therefore possible to delay determination of approach, thereby making it possible to delay occurrence of support than a case where the emergency vehicle approaches from behind. In a case where the vehicle crosses the emergency vehicle, it is difficult to recognize the emergency vehicle. This may lead to crash stop. It is therefore necessary to hurry up determination of approach, thereby allowing support to occur earlier. A communication system 100 according to Embodiment 2 is similar to that of FIG. 1, a base station device 10 according to Embodiment 2 is similar to that of FIG. 2, and a terminal device 14 according to Embodiment 2 is similar to that of FIG. 4. In the following description, differences are mainly described.

A determining section 84 of FIG. 4 compares the position and the travelling direction in position information supplied from a position information acquiring section 64 and the position and the travelling direction in position information supplied from an extracting section 72. The determining section 84 estimates a relative direction between the vehicle 12 and the emergency vehicle at the time of an encounter with an emergency vehicle. Specifically, a coordinate having an angle which increases in a clockwise direction assuming that the travelling direction of the vehicle 12 is 0 degree is specified. Here, the angle of 90 degrees means that the emergency vehicle exists directly right of the vehicle, the angle of 180 degrees means that the emergency vehicle exists directly behind the vehicle, the angle of 270 degrees means that the emergency vehicle exists directly left of the vehicle, and the angle of 360 degrees coincides with the angle of 0 degree. For example, the determining section 84 defines, as an anterior region, a region from the angle of 350 degrees to the angle of 360 degrees and a region from the angle of 0 degree to the angle of 10 degrees and defines, as a posterior region, a region from the angle of 170 degrees to the angle of 190 degrees. Furthermore, the determining section 84 derives a relative direction on the basis of the angle on such a coordinate system. In a case where the relative direction is included in the anterior region, the determining section 84 determines that the emergency vehicle is "approaching from front". In a case where the relative direction is included in the posterior region, the determining section 84 determines that the emergency vehicle is "approaching from behind". Furthermore, the determining section 84 also specifies that the emergency vehicle is "approaching at an anterior intersection" on the basis of road information stored in a storage section 82, as in the deriving section 80.

The determining section 84 adjusts the first threshold value and the second threshold value in accordance with the specified contents. FIG. 9 illustrates a data structure of a table held by the determining section 84 according to Embodiment 2 of the present disclosure. As illustrated in FIG. 9, the table includes a condition column 310 and a process column 312. In a case where a condition shown in the condition column 310 is satisfied, the determining section 84 changes the first threshold value and the second threshold value as shown in the process column 312. The following description returns to FIG. 4. As the first threshold value and the second threshold value become smaller, it becomes more difficult to detect approach of an emergency vehicle. As the first threshold value and the second threshold value become larger, it becomes easier to detect approach of an emergency vehicle.

According to the embodiment of the present disclosure, notification suitable for a situation can be performed since the first threshold value and the second threshold value are adjusted in accordance with the relative position. Furthermore, in a case where an emergency vehicle approaches from the front, the first threshold value and the second threshold value are made small. This makes it difficult to detect approach of the emergency vehicle. Since it is difficult to detect approach of the emergency vehicle, it is possible to suppress occurrence of unnecessary notification. Furthermore, in a case where an emergency vehicle approaches from behind or approaches at an intersection ahead, the first threshold value and the second threshold value are made large. This makes it easy to detect approach of the emergency vehicle. Since it is easy to detect approach of the emergency vehicle, it is possible to call a driver's attention.

Embodiment 3

Next, Embodiment 3 of the present disclosure is described. Embodiment 3 also relates to changing the first threshold value and the second threshold value as in Embodiment 1. In a case where a traffic light in front of a running vehicle is blue, delay of recognition of approach of an emergency vehicle necessitates crash stop right before an intersection. In Embodiment 3, in a case where the vehicle and an emergency vehicle are going to cross each other at an intersection and where a traffic light in the travelling direction of the vehicle is "blue", the first threshold value and the second threshold value are changed so that support occurs at an earlier timing. A communication system 100 according to Embodiment 3 is similar to that of FIG. 1, a base station device 10 according to Embodiment 3 is similar to that of FIG. 2, and a terminal device 14 according to Embodiment 3 is similar to that of FIG. 4. In the following description, differences are mainly described.

A modulating and demodulating section 54 and a processing section 56 of FIG. 4 receive a packet signal from the base station device 10 as described above. The packet signal includes information (hereinafter referred to as "light color information") concerning the color of a traffic light at an intersection or the like and information (hereinafter referred to as "traffic light information") for recognizing the traffic light so that the light color information and the traffic light information are associated with each other. The light color information indicates "red", "yellow", or "blue" or indicates "schedule of change of the light color". The traffic light information includes information concerning the position of a traffic light or includes information for recognizing the traffic light. An extracting section 72 extracts the light color information and the traffic light information from the packet signal and then supplies the light color information and the traffic light information to a determining section 84. That is, the extracting section 72 accepts light color information on a traffic light located in the travelling direction of the vehicle 12.

The determining section 84 accepts the light color information and the traffic light information from the extracting section 72. The determining section 84 determines, on the basis of the traffic light information, whether or not a traffic light corresponding to the traffic light information is the traffic light which the vehicle 12 is going to pass. For this purpose, in a case where information concerning the position is included in the traffic light information, the information concerning the position is used. Meanwhile, in a case where the recognition information is included in the traffic light information, the position is specified on the basis of the recognition information, and the specified position is used. Note that in order to specify the position on the basis of the recognition information, a table in which the recognition information and the position are associated with each other is stored in advance in the determining section 84. In a case where the determining section 84 determines that the traffic light is the traffic light which the vehicle 12 is going to pass, the determining section 84 specifies the color indicated by the light color information.

FIG. 10 illustrates a data structure of a table held in the determining section 84 according to Embodiment 3 of the present disclosure. As illustrated in FIG. 10, the table includes a condition column 320 and a process column 322. In a case where a condition shown in the condition column 320 is satisfied, a process shown in the process column 322 is performed. The following description returns to FIG. 4. In a case where the color of the traffic light is blue, the determining section 84 increases the first threshold value and the second threshold value. That is, the determining section 84 adjusts the first threshold value and the second threshold value in accordance with the light color information. Note that it is also possible that an emergency vehicle acquire traffic light information of an intersection that is on a pathway of the emergency vehicle, and the acquired information be transmitted together with a packet signal. In this case, it is determined on the vehicle side whether the vehicle crosses or runs in the same direction as the pathway of the emergency vehicle and thus determines the color of a traffic light that is on the pathway of the vehicle.

According to the embodiment of the present disclosure, the first threshold value and the second threshold value are adjusted in accordance with the color of the traffic light. Therefore, notification can be performed in accordance with the color of the traffic light. Furthermore, since the first threshold value and the second threshold value are increased in a case where the color of the traffic light is blue, the probability of notification can be increased. Since the probability of notification is increased, it is possible to improve safety.

Embodiment 4

Next, Embodiment 4 of the present disclosure is described. Embodiment 4 relates to communication between a terminal device mounted in an emergency vehicle and a terminal device mounted in a vehicle, as in the above embodiments. In a case where the emergency vehicle passes an intersection and where the color of a traffic light in the travelling direction of the emergency vehicle is red, there is a greater risk than in a case where the color of a traffic light is blue. An object of Embodiment 4 is to reduce the risk of collision in a case where an emergency vehicle enters an intersection when a traffic light is red. A terminal device according to Embodiment 4, especially a terminal device mounted in an emergency vehicle transmits a packet signal including information (hereinafter referred to as "red traffic signal crossing information") indicating that the emergency vehicle is crossing a red traffic signal in a case where a traffic signal at an intersection which the emergency vehicle enters is red. A communication system 100 according to Embodiment 4 is similar to that of FIG. 1, a base station device 10 according to Embodiment 4 is similar to that of FIG. 2, and a terminal device 14 according to Embodiment 4 is similar to that of FIG. 4. In the following description, differences are mainly described.

The terminal device 14 illustrated in FIG. 4, especially a modulating and demodulating section 54 and a processing section 56 of the terminal device 14 mounted in an emergency vehicle receive a packet signal including light color information and traffic light information from the base station device 10 as in Embodiment 3. An extracting section 72 extracts the light color information and the traffic light information from the packet signal and then supplies the light color information and the traffic light information to a generating section 66. The generating section 66 accepts the light color information and the traffic light information from the extracting section 72. The generating section 66 determines, on the basis of the traffic light information, whether or not a traffic light corresponding to the traffic light information is a traffic light which the emergency vehicle is going to pass. This is similar to the process performed by the determining section 84 of Embodiment 3. In a case where the generating section 66 determines that the traffic light is a traffic light which the emergency vehicle is going to pass, the generating section 66 specifies the color of the traffic light indicated by the light color information. In a case where the specified color of the traffic light is red, the generating section 66 inserts the red traffic signal crossing information into the packet signal. FIG. 11 illustrates information included in a packet signal according to Embodiment 4 of the present disclosure. As illustrated in FIG. 11, "red traffic signal crossing" information is included in the packet signal.

The terminal device 14 illustrated in FIG. 4, especially the modulating and demodulating section 54 and the processing section 56 of a terminal device 14 mounted in a vehicle 12 other than an emergency vehicle receive a packet signal from the terminal device 14 mounted in the emergency vehicle. The extracting section 72 extracts the red traffic signal crossing information from the packet signal. The extracting section 72 supplies the red traffic signal crossing information to the notifying section 70. The notifying section 70 notifies a driver that the emergency vehicle enters the intersection even if the traffic light is red on the basis of the red traffic signal crossing information.

According to the embodiment of the present disclosure, the red traffic signal crossing information is included in a packet signal. Therefore, even in a case where an emergency vehicle enters an intersection against a red traffic light, a driver of a nearby vehicle can be notified of the entry into the intersection against the red light. Furthermore, since a driver of a nearby vehicle can be notified of the entry into the intersection against the red light, it is possible to reduce the risk of occurrence of a collision accident.

Embodiment 5

Next, Embodiment 5 of the present disclosure is described. Embodiment 5 relates to communication between a terminal device mounted in an emergency vehicle and a terminal device mounted in a vehicle as in the above embodiments. Embodiment 5 is directed especially to a case where a fast emergency vehicle preemption system (FAST) is performed. The fast emergency vehicle preemption system is a system for controlling traffic lights so that an emergency vehicle can be given priority. An object of the fast emergency vehicle preemption system is to shorten a time needed for an emergency vehicle to arrive at the scene of an accident and to prevent a traffic accident caused by emergency driving. For example, the fast emergency vehicle preemption system uses an optical beacon (optical vehicle sensor) provided around an intersection. Specifically, when an emergency vehicle equipped with a transmitter is in emergency driving, a receiver on a road senses this. The result is transmitted to a traffic control center, and the traffic control center shortens the duration of a red traffic light in the travelling direction of the vehicle or extends the duration of a blue traffic light in the travelling direction of the vehicle.

However, in a case where the fast emergency vehicle preemption system is being performed, a driver of a vehicle other than the emergency vehicle may have a feeling of strangeness because of an unusual interval at which the color of the traffic signal is changed. In a case where the fast emergency vehicle preemption system is being performed, it is therefore desirable that a driver of a vehicle other than the emergency vehicle be notified of the situation. In order to achieve this, a terminal device according to Embodiment 5, especially a terminal device mounted in an emergency vehicle transmits a packet signal including information (hereinafter referred to as "FAST control information") indicating that FAST control is being performed. A communication system 100 according to Embodiment 5 is similar to that of FIG. 1, a base station device 10 according to Embodiment 5 is similar to that of FIG. 2, and a terminal device 14 according to Embodiment 5 is similar to that of FIG. 4. In the following description, differences are mainly described.

The terminal device 14 illustrated in FIG. 4, especially a generating section 66 of a terminal device 14 mounted in an emergency vehicle detects that FAST control is being performed. In response to this, the generating section 66 inserts FAST control information into the packet signal. FIG. 12 illustrates information included in the packet signal according to Embodiment 5 of the present disclosure. As illustrated in FIG. 12, the "FAST control" information is included in the packet signal.

The terminal device 14 illustrated in FIG. 4, especially a modulating and demodulating section 54 and a processing section 56 of a terminal device 14 mounted in a vehicle 12 other than the emergency vehicle receives the packet signal from the terminal device 14 mounted in the emergency vehicle. The extracting section 72 extracts the FAST control information from the packet signal. The extracting section 72 supplies the FAST control information to the notifying section 70. The notifying section 70 notifies a driver that FAST control is being performed on the basis of the FAST control information. Upon receipt of the FAST control information, in a case where the vehicle 12 is running on the same pathway as the emergency vehicle (in opposite directions), the terminal device 14 notifies the driver that the vehicle 12 is running a pathway under FAST control and that there is a possibility that the emergency vehicle is running a higher speed than usual. Meanwhile, in a case where the pathway of the vehicle 12 cross the pathway of the emergency vehicle, the terminal device 14 notifies the driver that a traffic light at an intersection in front of the vehicle 12 is fixed to red by FAST control and does not change into blue until the emergency vehicle passes.

According to the embodiment of the present disclosure, since the FAST control information is included in a packet signal, a driver of a vehicle other than an emergency vehicle can be notified of the situation.

Embodiment 6

Next, Embodiment 6 of the present disclosure is described. Embodiment 6 relates to communication between a terminal device mounted in an emergency vehicle and a terminal device mounted in a vehicle as in the above embodiments. The terminal device mounted in the vehicle notifies a driver of an encounter with the emergency vehicle on the basis of position information. For example, in a case where the vehicle encounters the emergency vehicle face-to-face, the driver of the vehicle is notified of the risk of head-on collision with the emergency vehicle. However, in a case where there is a center divider on a road on which the vehicle is running, such notification is unnecessary. In order to cope with this, a terminal device according to Embodiment 6, especially a terminal device mounted in an emergency vehicle transmits a packet signal including information (hereinafter referred to as "center divider presence information") indicating that there is a center divider. A communication system 100 according to Embodiment 6 is similar to that of FIG. 1, a base station device 10 according to Embodiment 6 is similar to that of FIG. 2, and a terminal device 14 according to Embodiment 6 is similar to that of FIG. 4. In the following description, differences are mainly described.

The terminal device 14 illustrated in FIG. 4, especially a modulating and demodulating section 54 and a processing section 56 of a terminal device 14 mounted in an emergency vehicle receives a packet signal including road information from the base station device 10. The road information, for example, indicates that a center divider is provided on a road. An extracting section 72 extracts the road information from the packet signal and supplies the road information to a generating section 66. The generating section 66 accepts the road information from the extracting section 72. The generating section 66 specifies, on the basis of the road information, that a center divider is provided on a road on which the emergency vehicle is running. In a case where there is a center divider, the generating section 66 inserts center divider presence information into the packet signal. FIG. 13 illustrates information included in the packet signal according to Embodiment 6 of the present disclosure. As illustrated in FIG. 13, the "center divider presence" information is included in the packet signal.

The terminal device 14 illustrated in FIG. 4, especially the modulating and demodulating section 54 and the processing section 56 of a terminal device 14 mounted in a vehicle 12 other than an emergency vehicle receives the packet signal from the terminal device 14 mounted in the emergency vehicle. The extracting section 72 extracts the center divider presence information from the packet signal. The extracting section 72 supplies the center divider presence information to the determining section 84. In a case where the determining section 84 receives the center divider presence information and where the vehicle 12 is running straight face-to-face with the emergency vehicle, the determining section 84 does not perform evasion support. This corresponds to not providing approach information of the emergency vehicle.

Figure 14:
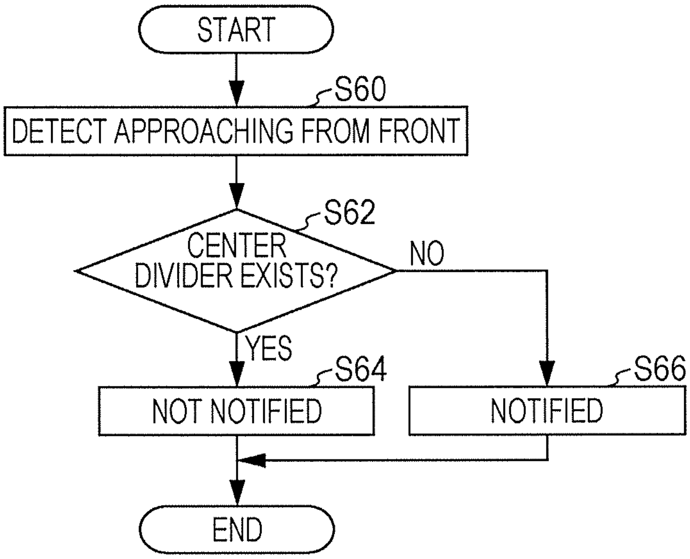
FIG. 14 is a flow chart showing a determining procedure performed by the terminal device according to Embodiment 6 of the present disclosure.

FIG. 14 is a flow chart showing a determining procedure performed by the terminal device 14 according to Embodiment 6 of the present disclosure. The determining section 84 detects approach from the front (S60). In a case where there is a center divider (YES in S62), the determining section 84 does not cause the notifying section 70 to perform notification (S64). Meanwhile, in a case where there is no center divider (NO in S62), the determining section 84 causes the notifying section 70 to perform notification (S66).

According to the embodiment of the present disclosure, in a case where there is a center divider, support is not performed. It is therefore possible to suppress unnecessary support.

Embodiment 7

Next, Embodiment 7 of the present disclosure is described. Embodiment 7 relates to a communication system that performs emergency vehicle passage support as in Embodiments 1 through 3. A terminal device mounted in an emergency vehicle wirelessly transmits information indicating "emergency driving" together with information such as the position, the travelling direction, and the speed of the emergency vehicle. In a case where a terminal device mounted in a vehicle that receives the information determines that the emergency vehicle is going to reach the vicinity of the vehicle within a certain time or in a case where the vehicle and the emergency vehicle are within a certain distance, the terminal device mounted in the vehicle notifies a driver of the result of determination. In this case, in a case where the emergency vehicle temporarily slows down, for example, when entering an intersection, the receiving-side vehicle judges that it takes a longer time for the emergency vehicle to reach the vicinity of the vehicle. As a result, support provided to the driver is temporarily stopped regardless of the situation in which the emergency vehicle is approaching.

In order to prevent this, a terminal device mounted in a vehicle according to the present embodiment manages the positional relationship with an emergency vehicle, for example, whether or not the emergency vehicle is approaching and in which direction the emergency vehicle is located. Once support occurs, the terminal device mounted in the vehicle maintains support even if the speed of the emergency vehicle becomes extremely slow, as long as the positional relationship is maintained. This makes it possible to continue the support while the emergency vehicle is approaching. A communication system 100 according to Embodiment 7 is similar to that of FIG. 1, a base station device 10 according to Embodiment 7 is similar to that of FIG. 2, and a terminal device 14 according to Embodiment 7 is similar to that of FIG. 4. In the following description, differences are mainly described.

An estimating section 78 of FIG. 4 estimates a time taken for a vehicle 12 and an emergency vehicle to encounter each other and then supplies the estimated time to a determining section 84 as described above. A deriving section 80 derives a distance between the vehicle and the emergency vehicle and then supplies the derived distance to the determining section 84 as described above. The determining section 84 accepts the time from the estimating section 78 and accepts the distance from the deriving section 80. In a case where the time estimated by the estimating section 78 is equal to or less than a first threshold value or in a case where the distance derived by the deriving section 80 is equal to or less than a second threshold value, the determining section 84 determines that there will be encounter with the emergency vehicle. In the other cases, the determining section 84 determines that there will be no encounter with the emergency vehicle.

In a case where the determining section 84 determines that there will be encounter with the emergency vehicle, the determining section 84 acquires a positional relationship at the time of an encounter between the vehicle 12 and the emergency vehicle. The positional relationship corresponds to a relative angle at the time of an encounter between the vehicle 12 and the emergency vehicle. Specifically, assuming such a coordinate system that the travelling direction of the vehicle 12 is 0 degree and that the angle increases in a clockwise direction, an angle of entry of the emergency vehicle is indicated as a relative angle. The determining section 84 stores therein, as an "initial angle", the positional relationship, i.e., the relative angle. Thereafter, the determining section 84 continuously performs determination on the basis of a time and a distance that are regularly acquired.

In a case where the first determination of an encounter is made because the time estimated by the estimating section 78 is equal to shorter than the first threshold value, the drop in the running speed of the emergency vehicle may result in that the time estimated by the estimating section 78 becomes longer than the first threshold value. It is assumed here that the distance derived by the deriving section 80 is longer than the second threshold value. In this case, the state shifts from "encounter" to "no encounter". Thereafter, in a case where the time estimated by the estimating section 78 becomes equal to or less than the first threshold value as a result of an increase in the running speed of the emergency vehicle or in a case where the distance derived by the deriving section 80 becomes equal to or less than the second threshold value as a result of the progress of the emergency vehicle, the state shifts from "no encounter" to "encounter". That is, regardless of the situation in which the emergency vehicle is approaching the vehicle, the state determined by the determining section 84 shifts from "encounter" to "no encounter" and then shifts to "encounter". This means that support provided to the driver is temporarily stopped. In order to prevent this, in a case where the time estimated by the estimating section 78 becomes longer than the first threshold value after it is determined that there will be encounter, the determining section 84 acquires a positional relationship at this point in time (hereinafter referred to as "target angle"). Furthermore, the deriving section 80 specifies an angular range including the initial angle. The angular range is, for example, defined as ±15 degrees from the initial angle. In a case where the target angle is included in the angular range, the deriving section 80 determines that the positional relationship between the vehicle and the emergency vehicle is maintained, and continues the state of "encounter". Meanwhile, in a case where the target angle is not included in the angular range, the deriving section 80 determines that the positional relationship between the vehicle and the emergency vehicle is not maintained, and changes the state from "encounter" to "no encounter".

Figure 15:
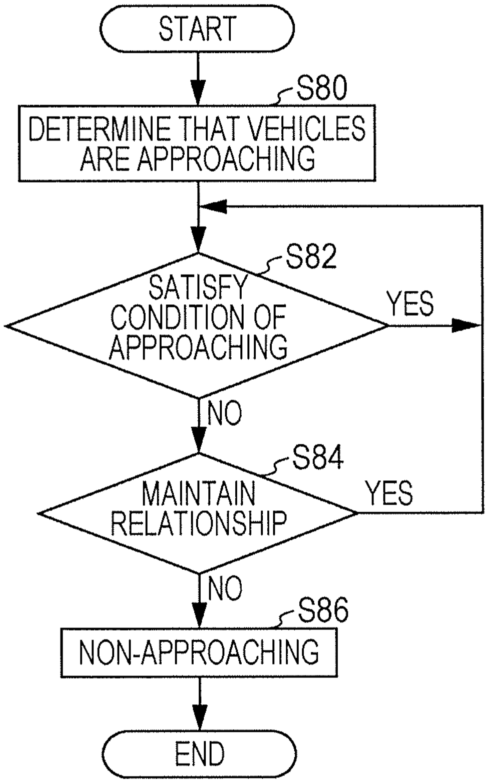
FIG. 15 is a flow chart showing a determining procedure performed by the terminal device according to Embodiment 7 of the present disclosure.

FIG. 15 is a flow chart showing a determining procedure performed by the terminal device 14 according to Embodiment 7 of the present disclosure. The determining section 84 determines that the vehicle 12 and the emergency vehicle are approaching each other (S80). In a case where the relationship is maintained (YES in S84) even if the state of approach is not satisfied (NO in S82), the determining section 84 maintains the state of approach and then returns to Step 82. In a case where the state of approach is satisfied (YES in S82), the determining section 84 maintains the state of approach and then returns to Step 82. Meanwhile, in a case where the relationship is not maintained (NO in S84), the determining section 84 determines that there will be no contact (S86).

According to the embodiment of the present disclosure, once it is determined that there will be encounter, it is determined that the vehicle and the emergency vehicle are approaching each other as long as the positional relationship (the initial angle) between the vehicle and the emergency vehicle is maintained. A driver can be continuously notified of the approach without stop of support even if the approaching emergency vehicle temporarily slows down, for example, when entering an intersection. Furthermore, since the driver can be continuously notified of the approach, the driver can be surely notified of the approach of the emergency vehicle.

Embodiment 8

Next, Embodiment 8 of the present disclosure is described. Embodiment 8 relates to a communication system in which it is determined whether or not a vehicle is approaching by transmitting position information among a plurality of terminal devices as in Embodiments 1 through 3. In particular, it is determined whether or not a vehicle is approaching on the basis of a time before encounter and a distance between the vehicles. In Embodiments 1 through 3, it is assumed that a vehicle and an emergency vehicle are approaching each other. Meanwhile, in Embodiment 8, it is assumed that vehicles each of which is not an emergency vehicle are approaching each other. Especially two cases are described below. One of the two cases is a case where a vehicle running on a driving lane changes the lane to a passing lane, and the other one of the two cases is a case where a vehicle running on a merging lane merges into a driving lane. A communication system 100 according to Embodiment 8 is similar to that of FIG. 1, a base station device 10 according to Embodiment 8 is similar to that of FIG. 2, and a terminal device 14 according to Embodiment 8 is similar to that of FIG. 4. In the following description, differences are mainly described.

Figure 16A:
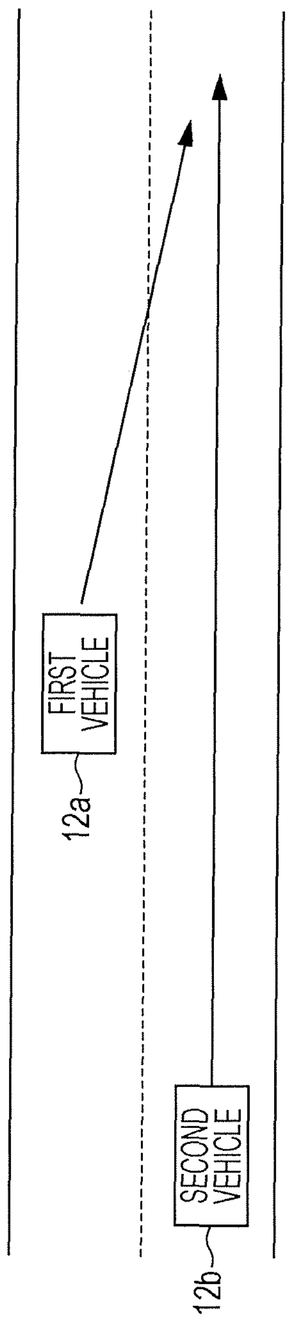
FIG. 16A is a view illustrating a configuration of a communication system according to Embodiment 8 of the present disclosure.
Figure 16B:
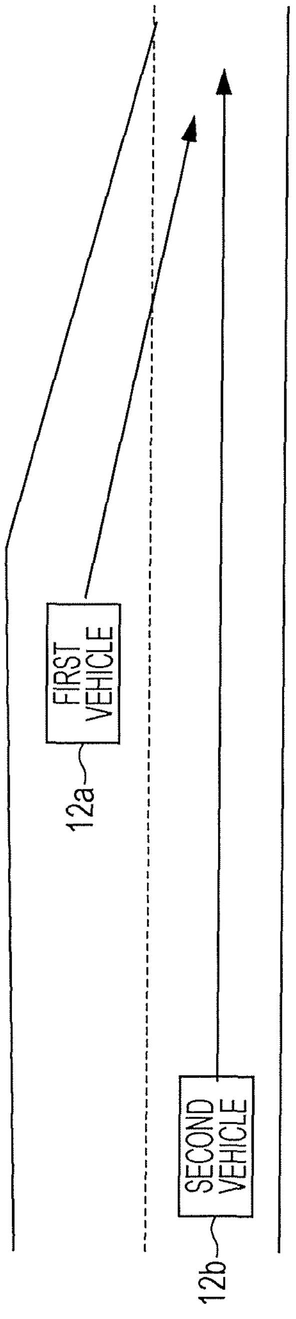
FIG. 16B is a view illustrating a configuration of a communication system according to Embodiment 8 of the present disclosure.

FIGS. 16A and 16B each illustrate a configuration of the communication system 100 according to Embodiment 8 of the present disclosure. In FIG. 16A, a first vehicle 12*a* is running on a driving lane, and a second vehicle 12*b* is running on a passing lane behind the first vehicle 12*a*. The following discusses notification by a terminal device 14 (not illustrated) mounted in the first vehicle 12*a*. The configuration of the terminal device 14 mounted in the first vehicle 12*a* is illustrated in FIG. 4 as described above, but a state determining section 76 includes an obtaining section (not illustrated).

The obtaining section obtains a trigger to change the lanes of which the vehicle 12 including the terminal device 14 is running. As a method for obtaining a trigger to change lanes, three methods are exemplified below. The first one is a case where a driver instructs a change of the travelling direction to the right side by using a direction indictor. The obtaining section is connected to the direction indictor or a control device that controls the direction indictor and receives an instruction to change the travelling direction. Upon reception of the instruction to change the travelling direction, the obtaining section recognizes that a trigger to change lanes has been obtained. Note that the instruction to change the travelling direction may be an instruction to change the lane to the left side instead of the instruction to change the lane to the right side. This corresponds to a case where the vehicle 12 running on the passing lane changes the lane to the driving lane.

The second one is a case where the obtaining section is connected to an on-board camera (not illustrated) and where the change of lanes is determined on the basis of an image taken by the on-board camera. Specifically, the on-board camera is mounted in the vehicle 12 so as to be able to take an image in a range from the travelling direction of the vehicle 12 to around 90 degrees or 270 degrees. For that purpose, the on-board camera takes an image of white lines (continuous lines, broken lines) or yellow lines (hereinafter collectively referred to as "white lines") provided along the lane on which the vehicle 12 is running. The obtaining section measures a distance to a white line on the right side in the travelling direction on the basis of the taken image by image-recognition processing. Such measurement of the distance is continuously performed. The obtaining section detects approach of the vehicle 12 to the white line by the continuous measurement. For example, in a case where the distance is decreasing over a certain period and where the final distance is shorter than a threshold value, it is recognized that the obtaining section has obtained a trigger to change the lane.

The third one is a case where a combination of a rotation angle of a steering and an image taken by an on-board camera is used. In this case, the obtaining section accepts an image taken by the on-board camera in a similar manner to above. The on-board camera is mounted in the vehicle 12 so as to be able to take an image of the travelling direction of the vehicle 12. The obtaining section detects, on the basis of the taken image, whether or not the lane on which the vehicle 12 is running is a straight lane or the angle of a curve on which the vehicle 12 is running by image-recognition processing. The obtaining section is connected to the steering or a control device that controls the steering and receives information on the rotation angle of the steering.

The obtaining section derives an angle (hereinafter referred to as an "evaluated angle") obtained by subtracting the angle of the curve from the rotation angle of the steering in a case where the rotation angle of the steering and the angle of the curve are directed in an identical direction. Meanwhile, in a case where the rotation angle of the steering and the angle of the curve are directed in opposite directions, an angle (hereinafter referred to as an "evaluated angle") obtained by adding the angle of the curve to the rotation angle of the steering is derived. Meanwhile, in a case where the lane is a straight lane, the obtaining section regards, as an "evaluated angle", the rotation angle of the steering. Each of these evaluated angles corresponds to an angle of inclination of the vehicle 12 relative to the lane. In a case where the absolute value of the evaluated angle is larger than a threshold value, it is recognized that the obtaining section has obtained a trigger to change the lane. In a case where the obtaining section has obtained the trigger, the determining section 84 starts the aforementioned notification.

In FIG. 16A, it is assumed that the first vehicle 12*a* is running at 60 km per hour and that the second vehicle 12*b* is running at 100 km per hour. Under such a circumstance, in a case where the obtaining section of the first vehicle 12*a* obtains a trigger, the determining section 84 of the first vehicle 12*a* performs a determining process on the basis of a time before approach because of a large difference in speed between the first vehicle 12*a* and the second vehicle 12*b* and a long distance between the first vehicle 12*a* and the second vehicle 12*b*. In FIG. 16A, it is assumed that the first vehicle 12*a* is running at 60 km per hour and that the second vehicle 12*b* is running at 60 km per hour. Under such a circumstance, in a case where the obtaining section of the first vehicle 12*a* obtains a trigger, the determining section 84 of the first vehicle 12*a* performs a determining process on the basis of a distance between the first vehicle 12*a* and the second vehicle 12*b* because of a small difference in speed between the first vehicle 12*a* and the second vehicle 12*b*.

In FIG. 16B, it is assumed that the first vehicle 12*a* is running on the merging lane at 60 km per hour, and the second vehicle 12*b* is running on the driving lane at 100 km per hour behind the first vehicle 12*a*. Under such a circumstance, in a case where the obtaining section of the first vehicle 12*a* obtains a trigger, the determining section 84 of the first vehicle 12*a* performs a determining process on the basis of a time before approach because of a large difference in speed between the first vehicle 12*a* and the second vehicle 12*b*. In FIG. 16B, it is assumed that the first vehicle 12*a* is running at 60 km per hour and that the second vehicle 12*b* is also running at 60 km per hour. Under such a circumstance, in a case where the obtaining section of the first vehicle 12*a* obtains a trigger, the determining section 84 of the first vehicle 12*a* performs a determining process on the basis of a distance between the first vehicle 12*a* and the second vehicle 12*b* because of a small difference in speed between the first vehicle 12*a* and the second vehicle 12*b*.

Figure 17:
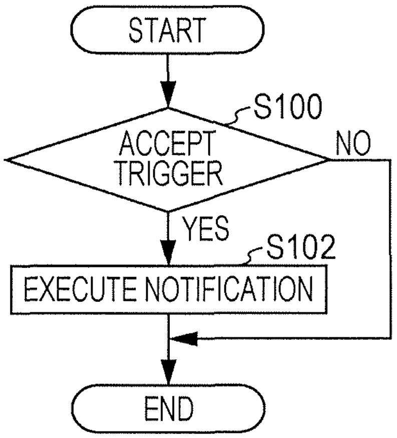
FIG. 17 is a flow chart showing a determining procedure performed by the terminal device according to Embodiment 8 of the present disclosure.

FIG. 17 is a flow chart showing a procedure of determination by the terminal device 14 according to Embodiment 8 of the present disclosure. In a case where the obtaining section accepts a trigger (YES in S100), the determining section 84 performs notification (S102). In a case where the obtaining section does not accept a trigger (NO in S100), Step 102 is skipped.

According to the embodiment of the present disclosure, in a case where a trigger to change a lane on which a vehicle is running is obtained, notification starts. This makes it possible to reduce the number of erroneous determinations. Furthermore, even in a case where a driver is notified of approach of a vehicle other than an emergency vehicle, the driver can be accurately notified of the approach of the vehicle.

The present disclosure has been described so far on the basis of the embodiments. These embodiments are merely illustrative examples, and it will be understood by a person skilled in the art that various modifications to combinations of the constituent elements or the processes in these embodiments are possible and that such modifications are encompassed within the scope of the present disclosure.

In Embodiments 2 and 3 of the present disclosure, the determining section 84 adjusts the first threshold value and the second threshold value. However, Embodiments 2 and 3 are not limited to this. The determining section 84 may adjust only one of the first threshold value and the second threshold value. According to this modification, the process can be made simple.

In Embodiment 3, the determining section 84 specifies the color of a traffic signal on the basis of light color information included in a packet signal supplied from the base station device 10. However, Embodiment 3 is not limited to this. For example, such an arrangement is also possible in which the vehicle 12 includes an imaging device that takes an image of a traffic light ahead, and the determining section 84 specifies the color of the traffic light included in the image by analyzing the image taken by the imaging device. According to this modification, it is possible to adjust the first threshold value and the second threshold value in accordance with the color of a traffic signal under a situation in which a packet signal is not received from the base station device 10.

Combinations of Embodiments 1 through 8 are also effective. According to the present modification, effects combining the effect of Embodiments 1 through 8 can be obtained.

What is claimed is:

1. A radio device that is mountable in a vehicle designed to run on roads, comprising:

a receiver that receives, from another radio device designed to run on roads, a packet signal including at least position information of another vehicle in which the other radio device is mounted;

a storage device that stores position information of intersections where roads meet each other; and a processor operative to:

acquire position information of the vehicle in which the radio device is mounted;

estimate a time taken for the vehicle and the other vehicle to encounter each other based on the acquired position information and the received position information included in the packet signal;

derive a distance between the vehicle and the other vehicle based on the acquired position information and the received position information included in the packet signal;

determine an encounter with the other vehicle when the estimated time is equal to or less than a first threshold value or when the derived distance is equal to or less than a second threshold value;

determine a no encounter with the other vehicle when the estimated time is more than the first threshold value or when the derived distance is more than the second threshold value;

provide notification of the encounter with the other vehicle when the estimated time is equal to or less than a first threshold value or when the derived distance is equal to or less than a second threshold value; and provide notification of the no encounter with the other vehicle when the estimated time is more than the first threshold value or when the derived distance is more than the second threshold value, wherein when deriving the distance, the processor is further operative to determine whether there is an intersection where a road on which the vehicle travels and a road the other vehicle travels meet each other, based on the position information of the intersections, and derive, as the distance between the vehicle and the other vehicle, a distance between the vehicle and the intersection based on the acquired position information and the stored position information of the intersections when there is an intersection between the vehicle and the other vehicle.

* * * * *